United States Patent Office 3,171,829
Patented Mar. 2, 1965

3,171,829
CONTINUOUS POLYMERIZATION OF EPSILON-CAPROLACTAM
Albert H. Wiesner, Chester, Orvill E. Snider, Petersburg, and Basil G. Apostle, Richmond, Va., assignors to Allied Chemical Corporation, New York, N.Y., a corporation of New York
No Drawing. Filed June 21, 1961, Ser. No. 118,515
6 Claims. (Cl. 260—78)

This invention relates to an improved process for polymerizing epsilon-caprolactam in a continuous manner. More particularly it relates to an improved process for continuously polymerizing epsilon-caprolactam to obtain polyamides of closely uniform average molecular weight as measured over successive samples and of relatively narrow molecular weight distribution in each sample.

It is well known to produce polycaproamides batchwise, by heating epsilon-caprolactam in the presence of suitable catalysts. In particular, it is known to heat epsilon-caprolactam in the presence of aqueous basic or acid catalyst and/or viscosity stabilizer at temperatures between 180° C. and 300° C. under superatmospheric pressure, and subsequently to distill out the water by heating the polymer mass under atmospheric pressure or below. Such removal of water from the viscous, poorly heat conducting polymer mass introduces variations in the molecular structure, especially in the lengths of the polymer chains, which variations in different portions of the polymer result in undesirable differences in the properties of different portions of finished articles made from the polymer. The use of foreign substances as viscosity stabilizers to control the range of variation of chain lengths in turn gives rise to additional problems; for by their very presence such foreign substances alter the structure and properties of the resultant polymer, nor do they eliminate undesirable structural variations therein.

It has been proposed to carry out polymerizations to form polyamides continuously under superatmospheric pressures passing the reactants and aqueous catalyst, viscosity stabilizer, etc. through heated reaction tubes operated at progressively lower pressures; or by spraying such reaction mixtures into an inert gas stream. Here again, the poor heat conductivity of the viscous polymers results in uneven reaction throughout the melt and hence in variations of average molecular weight in successive portions of the resulting polymer, and relatively wide molecular weight distributions in the polymer. These problems have been solved more or less successfully by the use of viscosity stabilizers together with use of tubes or jets of limited diameter; but these continuous processes of the prior art suffer from one or more of the following disadvantages:

(1) The utilization of foreign substances, to control molecular weight of the polymer chains necessarily affects other properties and hence limits the possible fields of application for a given polymer product;

(2) The relatively narrow tubular reactors have comparatively low unit capacity requiring numerous units to achieve a desirably high level of production, involving large capital and operating costs, and introducing variations in the polymer structure due to the difficulty of controlling the reaction from tube to tube;

(3) The continuous tube polymerization equipment is generally inflexible in that it is limited to producing polymer of only one range of viscosity.

Continuous polymerization processes known to the art operating at atmospheric pressures generally require residence times so extended as to complicate the overall problems of control and consistent operation besides involving low production rates.

Accordingly it can be seen that the known methods for polymerizing epsilon-caprolactam, and particularly those which operate in a continuous manner, leave much to be desired especially to the end of producing polymers of consistent average molecular weight in successive samples, and having narrow molecular weight distribution in each sample.

It is therefore an object of the present invention to provide an improved process or method for the continuous polymerization of epsilon-caprolactam to polyamide which is efficient and economical in operation.

Another object is to provide a continuous and rapid polymerization method by which the caprolactam is converted to polymer of more consistent molecular weight (i.e. showing smaller variance about the mean of the samples in average molecular weight) than is obtainable by the prior art methods; and by which the caprolactam is converted to polymer of relatively narrow molecular weight distribution as shown by the low ratio of weight average molecular weight: number average molecular weight determined by standard methods, whereby high values for properties such as tensile strength are imparted to finished articles made therefrom.

It is a further object to provide a flexible method capable of producing in the same equipment both polymers at viscosities suitable for molding, from which are obtained objects substantially free from flaws and other imperfections arising from varying average molecular weight in the polymer; and polymers at viscosities suitable for spinning, from which are obtained filaments with uniform values for properties such as tensile strength, dyeability, etc.

Our method comprises operations in three successive stages, the first stage and the subsequent stages being conducted in distinct reaction zones, suitably stirred kettles connected in series, wherein the reaction mass is heated or cooled when necessary via the containing walls; and has ratio of depth: mean diameter of the surface in the range of about 1:5 to 5:1; with depth ranging from about 0.5 ft. to about 30 ft.

The polymerizing mass in each reaction zone is smoothly stirred with movement driving the mass horizontally away from the heated containing walls of the reaction zones adequately to distribute the heat through each horizontal layer of the mass with a range of temperature deviations not exceeding ±10° C. about the mean temperature of the layer, preferably within ±5° C. of the mean. The stirring should create practically no turbulence, so that the reaction mass will progress through each reaction zone by "plug flow," without substantial back mixing. Thereby maximum conversion is obtained in each reaction zone for given residence time under given conditions. Suitable stirring is imparted by an anchor or horseshoe stirrer occupying practically the full depth and full diameter of the reaction mass and rotating with velocity of the blade along the containing wall of about 1 to 15 feet per second. Baffles are not necessary, but could be used to promote the desired "plug flow."

In the first reaction stage caprolactam containing water amounting to about 0.1% to about 10% by weight of the caprolactam supplied, is maintained at temperature between about 180° and about 300° C., preferably between about 240° and about 275° C., under water vapor pressure in the range between about 25 p.s.i.a. and about 150 p.s.i.a. (i.e. about 1.7–10 atmospheres absolute), preferably between about 30 and about 90 p.s.i.a (about 2–6 atmospheres absolute) for residence time in the range between about ½ hour and about 10 hours, preferably between about 2 and about 6 hours. In our process the caprolactam will normally be near but not necessarily at its isoelectric point; and water will usually be the sole reactive additive to the caprolactam; but inert filler, delustrant, pigment, ageing stabilizer or the like can be present in the first stage reaction mixture or can be added at a later stage.

The amount of water introduced with the caprolactam monomer is not highly critical but should be controlled and should be not more than 10% of hte monomer by weight, preferably not more than 4%. Greater proportions of water are undesirable since the eventual removal of unnecessarily large amounts of water in the manner hereinbelow described places an unnecessary burden on the heat transfer equipment. Lactam supplied to our process which contains up to about 0.5% water absorbs vapor from the atmosphere maintained thereover without at first polymerizing, this necessitating correspondingly longer residence time to obtain the desired extent of first stage polymerization; eventually this incoming lactam reaches a water content of 0.1%–0.5% by weight of water when maintained as in our process under an atmosphere containing water vapor.

Water vapor pressure and residence time in our first stage are interadjusted within the range of 25–150 p.s.i.a for water vapor pressure and ½ hour to 10 hours for residence time, so as to produce an effluent from the first stage containing from about 12% to about 30%, preferably 14–20% by weight of monomer and oligomers as measured by the weight percent of this effluent extractable by hot water, referred to hereinafter as "extractables." Said effluent also is to have a "Formic Acid Relative Viscosity" in the range from about 5 to about 30, preferably from about 7 to about 20. ("Formic Acid Relative Viscosity" is determined by ASTM test procedure No. D-789-53T.)

We have found that water vapor pressure maintained in the first stage of our process is an important factor in determining conversion of lactam in this stage, as measured by percent of the first stage effluent extractable therefrom by hot water, and in determining degree of first stage polymerization as measured by viscosity of first stage effluent (corrected for water therein). Other important factors determining this conversion and degree of polymerization in the first stage effluent are residence time and reaction temperature. Because conditions throughout the process are desirably kept as near constant as possible, it is highly important to maintain good control over the effluent from every stage.

Satisfactory control is evidenced in the first stage, we have found, when temperature of the effluent therefrom remains constant within about ±5° C. and when its Formic Acid Relative Viscosity remains constant within about ±5 units, preferably ±2 units, in successive samples.

The effects of the above variables in the first and later stages of our process can perhaps be better understood in the light of the theoretical considerations which follow. It is believed that the polymerization of epsilon-caprolactam can be initiated by water and that in the presence of water, the polymerization may occur by two types of reaction, viz. condensation and addition.

Thus caprolactam (CL) may be hydrolyzed (reaction 1) by water to aminocaproic acid (ACA) to initiate the polymerization:

$$CL + H_2O \rightarrow ACA \qquad (1)$$

The resulting aminocaproic acid molecules can condense (reaction 2), splitting out water to form polymer chains with amide linkages; and this reaction has a reverse (2') representing polymer hydrolysis:

$$nACA \rightleftarrows H_2N\text{-}[-(CH_2)_5-CONH-]_{n-1}$$
$$-(CH_2)_5-COOH \qquad (2)$$
$$(2')$$

Each of the $$H_2N\text{-}[-(CH_2)_5-CONH-]_{n-1}-(CH_2)_5-COOH$$

chains formed by (2) has an amino and a carboxylic end group each capable of reacting with caprolactam monomer to extend the chain. This lactam addition reaction (3) represents an alternative route instead of (2) above for continuing the lactam polymerization:

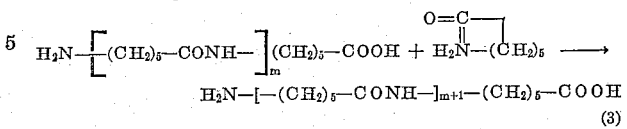
(3)

Higher steam pressures result in greater amounts of water present in the mass, favoring conversion of the monomer present, by monomer hydrolysis reaction (1) followed by condensation reaction (2) and addition reaction (3). However if the water vapor pressure is excessively high, the monomer hydrolysis can be so much accelerated versus addition reaction (3) as to repress reaction (3) by exhaustion of the monomer necessary therefor. Correspondingly, reaction (3) would be favored by initiating polymerization but preserving some monomer in the reaction mixture, which should result from using limited water vapor pressures in the initiation stage, then promptly removing water from the resulting product at a particular range of monomer content and a particular viscosity range.

Whatever the theoretical basis may be, we have found best operation in our process results by maintaining first stage water vapor pressures in the above specified range and by withdrawing first stage effluent at extractable content and viscosity ranges as above specified.

The effluent from this first stage is accordingly admitted into the second stage reaction zone wherein the mass is again maintained at ratio of depth:mean surface diameter in the range 1:5–3:1 and is again maintained by heated containing walls and stirring generally as in the first zone at temperature between about 180° and about 300° C., preferably between about 240° and about 275° C., for residence time in the range between about ½ hour and 10 hours, preferably between about 2 and about 6 hours. A current of dry inert gas, suitably at substantially atmospheric pressure, e.g. nitrogen, carbon dioxide, hydrogen, methane or the like is maintained through the "head space" in this reaction zone, i.e. the space in the reaction zone above the reaction mixture, sweeping the surface of the second stage reaction mixture.

In this second stage of our process the addition polymerization of reaction (3) above is believed to predominate. Removal of water, to prevent hydrolysis of the monomer, would favor such reaction. Conformably to this theory we have found that the dry sweep gas flow rate, melt temperature, and residence time are important variables in the second stage of our process and that interadjustment of the volumetric rate of flow of the dry sweep gas over the surface of the polymer melt, and residence time in this stage, can be utilized at given temperature to control the viscosity of the polymer leaving this second stage.

Thus, the slower the volumetric flow rate of sweep gas in this second reaction stage, the slower will be the viscosity increase therein; moreover for given second stage residence time, the lower will be the attainable viscosity of the final polymer formed in the third stage of our process wherein little or no further water is removed from the polymer. Conversely the faster the volumetric flow rate of sweep gas in this second stage the faster and greater will be the increase of viscosity of the polymer therein and the greater will be the attainable viscosity of the final polymer formed in the third stage.

By a "dry" sweep gas as used in our process we mean a gas having water vapor pressure not above about 10 mm. of mercury absolute; and preferably the sweep gas used is desiccated to negligible water vapor content, e.g. by passage through a tower of desiccant such as silica gel.

Among factors which influence the particular choice of rate to be used is the residence time of polymer in this second zone. This follows from the fact that as the polymerizing mass is moved in shorter time through this zone, a greater volume of water vapor must be removed in the sweep gas in unit time to effect a given increase in viscosity in this zone, all other variables being held constant. Moreover the surface area exposed to the sweep gas per unit volume of polymerizing mass in the particular apparatus used influences the rate at which the sweep gas must flow over the surface of the mass to obtain given viscosity increase in given time. The less the exposed surface area of the reaction mixture of given volume, the greater the volume of sweep gas which must move over this surface in given time in order to effect the required removal of water to obtain the desired viscosity increase—all other variables being held constant. Furthermore the viscosity attained by the polymer in this second stage will be a function of the extractable content, viscosity, and water content of the entering polymer from the first stage.

Sweep gas volumetric flow rate can be expressed as a space velocity, i.e. number of changes of the gas in the head space per unit time. In a typical reaction kettle containing melt at depth:mean surface diameter of about 1:5–3:1 as in our process, the head space (the free space above the surface of the polymer melt) will be about ⅕ to ⅓ the volume of the melt; and typically the sweep gas space velocities in the head space thereof in our process will be from about 2 to 100 changes per hour. It is pointed out however that suitable space velocities in any particular operations may be in different ranges since these space velocities are dependent upon the nature of the first stage product and the length of residence time and the design of the reaction zone as above indicated, all in relation to the final viscosity to be attained in the finished polymer.

The sweep gas flow rate is adjusted, usually within the range described above in correlation with residence time usually about the same as in the first stage, producing an effluent containing high molecular weight polymers and relatively little water and extractables. The adjustment is made by observing polymer viscosity. Specifically the Formic Acid Relative Viscosity of the second stage product is within ±5 units, preferably within ±2 units, at a level correlated with and normally some 10 to 30 units below the predetermined viscosity of the polymer to be withdrawn from the final stage—the selected viscosity for second stage effluent will be influenced by factors including residence times and inert gas flow rates in succeeding zones through which the mass will travel. The extractables in the second stage effluent will be between about 10% and about 18% when the first two stages have been properly controlled in accordance with the foregoing.

The polymer effluent from the second stage is admitted to a third stage reaction zone, preferably a zone distinct from that for the second stage, wherein the mass is stirred as before and maintained under substantially atmospheric pressure at a temperature between 240° and 300° C., preferably between 250° and 270° C. for a residence time between about one-half hour and about 10 hours, preferably between 2 and 6 hours. A current of inert gas is passed over the surface of the third stage polymer melt, the space velocity thereof being controlled in accordance with the same factors and in the same general manner as in the second stage. This gas can be dry as in the second stage or can contain controlled water vapor at controlled partial pressures.

As indicated by viscosity, the average chain length of the polymer effluent from the second stage of our process is much greater than in the polymer entering said stage. We believe this effluent is a mixture of polymers of varying chain lengths. In our third stage, moreover, the polyamide polymer contains much less water than is contained in the polymer entering the second stage. Equilibrium between reactions of polymer formation (2) and (3) above and the polymer hydrolysis reaction (2') is approached or reached at this third stage, we believe; and an amide exchange reaction can become significant, whereby in the various polymer molecules undergo fission and the fragments recombine to result in a narrower chain length distribution in the polymer.

The polymer viscosity reached in this third stage is affected by the water present therein and is accordingly controllable in our process by the sweep gas flow rate and water vapor partial pressure maintained in this third stage, and by the melt temperature therein. High sweep gas flow rates, low water vapor pressures in the gas and high melt temperatures can remove water from the melt, with increases of polymer viscosity resulting since the polymer hydrolysis reaction (2') above is thereby repressed; and conversely low sweep gas flow rates, high water vapor partial pressures and low melt temperatures can preserve or even build up the water content of the melt, so that the viscosity of the polymer entering the third stage will be maintained about constant or actually decreased therein as very large molecules, contributing heavily to the viscosity, are depolymerized by hydrolysis and/or amide exchange.

It is a feature of this invention that by control of the sweep gas flow rate, water vapor pressure, and temperature in stages (2) and (3), control over the average molecular weight as measured by viscosity of the polymer mass, and control over the breadth of the molecular weight distribution and over the uniformity of viscosity in successive samples can be obtained in continuous operation. In the third stage of our process we achieve the desired delicate control over the water present in the melt by controlling the several variables within the below defined ranges. The viscosity of the final polymer and other physical properties of the final polymer and of articles therefrom, such as tenacity, elongation and dyeing characteristics, can thus be made closely consistent in successive samples of these products and the molecular weight distribution of the polymer can be brought into the equilibrium range.

Thus, the melt in the third stage is smoothly stirred generally as in the previous stages and is maintained at temperature between about 240° and about 300° C. with a current of inert gas of controlled water vapor partial pressure sweeping over the surface of the melt, and with sweep gas flow rate and residence time interadjusted as in stage 2 to yield effluent of Formic Acid Relative Viscosity in the predetermined range, such as about 40–45 with extractable content between about 10 and 15% (i.e. about the equilibrium value at the reaction temperature). This condition is reached usually after a residence time in the third stage of about 2 to 6 hours. Preferably, a melt temperature between about 250° and about 270° C. is used, giving extractables in the range of about 10–12%.

The polymer effluent from the third stage is extruded into a bath of warm (25° to 40° C.) water in the form of a ribbon, in accordance with well known procedure.

Usually in our process distinct reaction zones, e.g. kettles, of the same dimensions will be used for each of the three stages and about the same liquid levels will be maintained in each zone, i.e. about the same residence times will be used in each stage. However, if deviations of viscosity in successive samples of the effluent from a stage, greater than prescribed, were observed the residence time therein could be lengthened as a corrective measure by raising the liquid level in a reaction zone or zones in said stage. Compensating changes could be made, e.g. in water vapor pressure, sweep gas flow rate, and/or reaction temperature to maintain the mean sample viscosity at the desired value.

Similarly, changes in residence times and/or water vapor pressures and/or sweep gas flow rates and/or reaction temperatures can be made when it is desired to change the viscosity grade of the polymer being produced. Typical viscosity grades for the polymers which can be produced all in the same apparatus by our process are from about 25 Formic Acid Relative Viscosity up to at least about 80.

Typical conditions used for carrying out a continuous process in accordance with our invention for the production of polycaproamide suitable for fabrication of tire cord and other fibers, molding resins and the like, can be outlined as follows.

Epsilon-caprolactam, kept blanketed by oxygen-free nitrogen, and containing from about 0.5% to about 4% water is heated above its melting point and passed into a jacketed pressure kettle provided with an anchor stirrer. The reaction mixture in this kettle occupies about ⅓ to ⅝ of the kettle volume. It is maintained under a pressure in the range of about 10 to 50 p.s.i.g. of steam. The rate of supplying caprolactam and withdrawing effluent maintains a residence time in the pressure kettle of about 1½ to 4 hours. A selected temperature between about 240°–260° C. is maintained; and the reaction mixture is smoothly stirred in the manner above described and evenly heated to maintain temperature deviations throughout the reaction mixture within a range of about ±5° C. Pressure of steam and residence time are interadjusted to afford a first effluent containing about 14–20% hot water extractables and having Formic Acid Relative Viscosity in the range 7–20 with variations within a range of about ±2 units.

This effluent passes from the pressure kettle to a second similar kettle kept about the same or somewhat more filled, and maintained at substantially atmospheric pressure and at a selected temperature between about 250° and 265° C. Desiccated nitrogen gas, free of oxygen, at space velocities between about 5 and about 35 changes of head space atmosphere per hour is passed over the surface of the mass which is being smoothly stirred as in the first kettle. The polymer flow is adjusted to maintain a residence time between about 2 and 4 hours in this second kettle and the sweep gas space velocity therein is regulated in accordance with polymer viscosity to maintain desired viscosity of the effluent within about ±2 Relative Formic Acid Viscosity units.

The melt is pumped from the second kettle to a third like kettle similarly filled, wherein it is smoothly stirred as in the second kettle, at a selected temperature between about 250° and 265° C. under substantially atmospheric pressure. Nitrogen, free of oxygen, at water vapor partial pressure controlled e.g. by passage through a desiccant or through water maintained at fixed temperature is passed over the surface of the mass at space velocities between about 2 and about 10 changes of head space atmosphere per hour, regulated to maintain viscosity at the desired level in the polymer effluent. The polymer flow rate is adjusted so as to provide a residence time in the third kettle between about 2 and 4 hours. The product is extruded from this kettle into warm water.

The term "Formic Acid Relative Viscosity" means viscosity determined by measuring density and efflux time of a solution of polymer in aqueous 90% formic acid at 25° C. and concentration of 11 grams of polymer per 100 ml. of solvent in accordance with ASTM Method No. D–789–53T.

In terms of molecular weights determined by conventional solution viscosity methods, e.g. in metacresol, a Formic Acid Relative Viscosity of 20 corresponds to about 10,000 molecular weight and a Formic Acid Relative Viscosity of 50 corresponds to about 18,000 molecular weight.

Viscosity data herein unless otherwise specified are given for the unwashed dried polymer. Such data are usually 5–20 units lower than comparable data for the washed and dried polymer.

The following examples will illustrate the process of our invention.

EXAMPLE 1

Epsilon-caprolactam containing not more than 1 milliequivalent per kilogram of NaOH as shown by neutralization of an aqueous solution thereof to Tashiro's indicator (pH 5.7) and containing 0.5% of water, was melted at 85°–90° C. and pumped under oxygen-free nitrogen at a rate of 8.2 lbs./hr. into a jacketed kettle provided with an anchor stirrer, an inlet for liquid at the top, an outlet at the bottom, a liquid level controller, an inlet for gas above the liquid level, a pressure regulator for the atmosphere over the liquid, and two thermocouple wells, one extending below the liquid level and one extending into the outlet line. This kettle had diameter of about one foot and height of about 1.5 feet and was filled to depth of about 0.5 foot. The melt was heated therein to 255° C. by passing Dowtherm at 270°–280° C. through the jacket, and was maintained under 50 p.s.i.g. steam pressure. Once the melt in the kettle reached the bottom of the stirrer, the stirrer was operated continuously during the 48 hours of the run at a speed which maintained effluent temperature at 255° C.±2° C. without appreciable turbulence in the melt (39 r.p.m.).

The residence time in this kettle was 2.7 hours. At intervals the Formic Acid Relative Viscosity was determined on the effluent leaving this kettle and the percent extractables was determined on composites of the same material. The results of these determinations are shown in Table I.

Table I

| Time of Sampling | Formic Acid Relative Viscosity | Percent Extractables |
| --- | --- | --- |
| Beginning | 9.9 | |
| Middle | 10.7 | 17–19 |
| End | 9.5 | |

The effluent from the first kettle at 255° C. was pumped to the top of a second like kettle wherein the pressure was maintained at substantially atmospheric. Desiccated nitrogen gas containing 12% carbon dioxide and less than 25 p.p.m. of oxygen was swept through this kettle continuously at the average rate of 2150 cc./minute corresponding to space velocity of about 10–15 changes of head space atmosphere per hour, under a slight (0.5 in Hg) gauge pressure. The kettle was filled to depth about one foot. The melt temperature was about 257° C. at entrance. This kettle was stirred in the same general manner as the first kettle, at a rate of 28–30 r.p.m. The liquid level was adjusted so as to provide a residence time of 5.0 hours for the melt in this kettle. The polymer melt exiting from the bottom of the second kettle had a temperature of 258° C.

The finished polymer was extruded from the bottom of this kettle at the rate of 8 lbs./hr. into a bath of warm (40°–50°) water. The difference of 8 lbs./hr. extrusion rate versus 8.2 lbs./hr. fed rate represents caprolactam vaporized in the sweep gas.

During the run the Formic Acid Relative Viscosity and percent extractables were determined on the polymer effluent. The results of these determinations are shown in Table II.

Table II

| Time of Sampling After Start-Up (Hrs.) | Formic Acid Relative Viscosity of Extruded Unwashed Product | Deviation from Mean | Percent Extractables |
| --- | --- | --- | --- |
| 28 | 30.2 | +.6 | |
| 32 | 28.4 | −1.2 | |
| 36 | 30.0 | +.4 | 11–13 |
| 40 | 30.9 | +1.3 | |
| 44 | 28.9 | −.7 | |
| 48 | 28.9 | −.7 | |

The average residence time of the polymerization was 7.7 hours. In 48 hours more than 350 lbs. of polymer of uniform average molecular weight as indicated by the surprisingly slight deviation from the mean relative viscosity of the finished polymer throughout the run was prepared in this continuous process which represents a considerable improvement in production capacity and quality of product over that obtainable from similar equipment by the batch process.

EXAMPLE 2

A continuous process was carried out generally as described in Example 1 above but using a third kettle for the third reaction stage and with other details differing as follows.

Kettle I:
    Steam pressure _____ 29.6 p.s.i.g.
    Lactam feed into system _____ 11.7 lbs./hr.

Temperatures—
        Entering lactam _____ 85°–90° C.
        Exiting mass _____ 249° C.
        Level _____ 10 inches.
        Residence time _____ 3.7 hrs.

Kettle II:
    Sweep gas rate _____ 1600 cc./min. (i.e. SV about 6 per hr.).

Temperatures—
        Entering polymer _____ 258° C.
        Effluent polymer _____ 255° C.
        Residence time _____ 3.6 hrs.

Kettle III:
    Sweep gas rate _____ 700 cc./min. (i.e. SV about 2.5 per hr.).

Temperatures—
        Entering polymer _____ 255° C.
        Effluent polymer _____ 253° C.
    Extrusion rate _____ 11.5 lbs./hr.
    Residence time _____ 3.6 hrs.
Duration of run _____ 50 hrs.

The Formic Acid Relative Viscosities and percent extractables of final polymer were determined as in Example 1. The results are given in tables III, IV and V below.

*Table III*

DATA ON INITIAL POLYMER STAGE

| Time of Sampling | Formic Acid Relative Viscosity | Percent Extractables |
|---|---|---|
| Beginning (5th hour) | 8.4 | |
| Middle (24th Hour) | 8.3 | 15.9 |
| End (48th hour) | 8.4 | |

*Table IV*

DATA ON SECOND POLYMERIZATION STAGE

| Time of Sampling | Formic Acid Relative Viscosity | Percent Extractables |
|---|---|---|
| Beginning | 19.9 | |
| Middle | 19.5 | 13.5 |
| End | 19.3 | |

*Table V*

DATA ON FINAL STAGE OF POLYMERIZATION

| Time of Sampling After Start-Up (Hrs.) | Formic Acid Relative Viscosity of Extruded Unwashed Product | Deviation from Mean | Percent Extractables |
|---|---|---|---|
| 40 | 44.1 | −.1 | |
| 42 | 42.6 | −1.6 | |
| 44 | 45.2 | +1.0 | 10–12 |
| 46 | 45.0 | +.8 | |
| 48 | 43.5 | −.7 | |
| 50 | 44.7 | +.5 | |

It will readily be seen from the foregoing illustrative examples that an improved continuous process for the manufacture of polycaproamides of uniform average molecular weight has been devised. The polycaproamides produced thereby in efficient and economical manner are characterized by their uniform molecular weight which is reflected in the uniformity of the physical properties of the polyamide products, e.g. films, fibers, castings, etc. fabricated therefrom. These improvements and others which should be obvious to those skilled in this art follow in part from the discovery of a practical means of handling molten polymer masses which are known to be poor heat conductors wherein the diameter of the mass approaches the height of the mass in such manner as to obtain more uniform heat distribution throughout the mass. The unique method of agitating the several polymer masses wherein that portion of the mass in contact with the heat surfaces is constantly being moved in a lateral direction and in essentially plug flow in a novel feature of our invention. This together with the close control of the viscosity which is obtained by means of the adjustment of the sweep gas rate and temperature accounts for the rather surprising improvements attributable to our process.

Our invention is not to be limited to the specific details of the above purely illustrative examples, since many variations thereof within the scope of our invention will be obvious to those skilled in this art.

We claim:

1. Method for continuously polymerizing epsilon-caprolactam which comprises carrying out said polymerization in three successive stages of reaction, the first stage being conducted in a distinct reaction zone from the subsequent stages, the reaction mixture in each zone being maintained as a mass with temperature controlled by heat flow from the containing walls, with a surface exposed to an atmosphere thereover, and with a depth:mean diameter of surface in the range between about 1:5 and about 5:1 and depth range from about 0.5 ft.–30 ft., and being stirred with movement driving the mass horizontally away from the containing walls adequately to maintain deviations of the temperature not exceeding ±10° C. about the mean temperature throughout each horizontal layer of the reaction mass while maintaining essentially plug flow through the reaction zone without substantial back mixing in the reaction zone, and which comprises:

For the first stage of reaction, supplying caprolactam containing about 0.1%–10% by weight of water, maintaining temperature between about 180° C. and about 300° C., maintaining water vapor pressure between 25 p.s.i.a. and about 150 p.s.i.a., maintaining residence time of the reaction mixture between about ½ hour and about 10 hours, and interadjusting water vapor pressure and residence time in response to measurements of hot water extractable content and Formic Acid Relative Viscosity of the first stage effluent, maintained in the ranges between 12% and 30% by weight for extractable content and between 5 and 30 units for Formic Acid Relative Viscosity, within deviation of ±5 units from the mean in successive samples, said interadjustment being in the sense that higher water vapor pressures up to a value of about 90 p.s.i.a., and longer residence times up to about 6 hours correspond to decreasing mean values for extractable content and increasing mean values for Formic Acid Relative Viscosities and longer residence times correspond to smaller deviations of the Formic Acid Relative Viscosities from the means;

For the second stage of reaction, admitting effluent from the first stage into a reaction zone wherein the mass is maintained with ratio of depth:surface area and under stirring as above specified and at temperature between about 180° C. and about 300° C., maintaining residence time of the reaction mixture in the range between about ½ hour and about 10 hours; maintaining a current of dry inert gas through the head space over the reaction mixture sweeping the surface of the reaction mixture and thus removing water from the second reaction zone; and interadjusting residence time in the second stage and volumetric flow rate of the dry sweep gas to maintain viscosity of the effluent from this second stage at a level correlated with the predetermined final value for polymer viscosity within deviation from the mean for successive samples of more than ± Formic Acid Relative Viscosity units, in the sense that longer residence times and higher sweep gas rates correspond to higher mean values of Formic Acid Relative Viscosities of the second stage effluent and longer residence times correspond to smaller deviations of Formic Acid Relative Viscosities from the means;

For the third stage of reaction, maintaining the mass with ratio of depth:surface area and under stirring as above specified and under a current of inert gas of controlled water vapor partial pressure sweeping the surface of the reaction mass as above specified for the second stage, and at temperature between about 240° C. and about 300° C.; and interadjusting residence time of the reaction mixture in the third stage and volumetric flow rate of the sweep gas in the sense as defined for the second stage, maintaining viscosity of the effluent in a predetermined range; the Formic Acid Relative Viscosity units above recited being as determined by ASTM Test Procedure No. D-789-53T wherein the concentration is 11 grams of polymer per 100 milliters of aqueous 90% formic acid and the temperature is 25° C.

2. Method as defined in claim 1 wherein each of the three reaction stages is conducted in at least one distinct reaction zone.

3. Method as defined in claim 2 wherein the caprolactam supplied to the first stage contains not above about 4% by weight of water, the water vapor pressure maintained over the first stage reaction mixture is in the range of about 30-90 p.s.i.a., the temperature maintained in the first stage and that maintained in the second stage are in the range between about 240° C. and about 275° C. and the temperature maintained in the third stage is between about 250° C. and about 270° C. and the residence time maintained in each of the three stages is between about 2 and about 6 hours.

4. Method as defined in claim 3 wherein the second stage the sweep gas space velocity is between about 5 and about 35 changes of head space atmosphere per hour and the sweep gas space velocity in the third stage is between about 2 and about 10 changes of head space atmosphere per hour and wherein the stirring movement along the containing walls of each reaction zone is at a rate of about 1 to 15 ft. per second.

5. Method of claim 1 wherein the current of inert gas sweeping the surface of the reaction mass over the third stage of reaction is dry gas, having a controlled water vapor partial pressure in the range from that of dessicated gas up to about 10 mm. of mercury absolute.

6. Method of claim 5 wherein the reaction mixture undergoing the second and the third stages of reaction is passed in plug through a single reaction zone in which the inert gas sweeping the surface of said reaction mixture is desiccated gas.

References Cited in the file of this patent
UNITED STATES PATENTS

| | | |
|---|---|---|
| 2,241,322 | Hanford | May 6, 1941 |
| 2,562,796 | Koch | July 31, 1951 |
| 2,735,839 | Schrenk | Feb. 21, 1956 |
| 3,047,541 | Ryffel et al. | July 31, 1962 |
| 3,090,773 | Papero et al. | May 21, 1963 |

OTHER REFERENCES

Ser. No. 309,376, Friederich et al. (A.P.C.), published Apr. 20, 1943.